United States Patent
Long et al.

[19]

[11] Patent Number: 6,139,943

[45] Date of Patent: Oct. 31, 2000

[54] BLACK THERMAL CONTROL FILM AND THERMALLY CONTROLLED MICROWAVE DEVICE CONTAINING POROUS CARBON PIGMENTS

[75] Inventors: Lynn E. Long, Manhattan Beach; Robert L. Reynolds, Los Angeles, both of Calif.

[73] Assignee: Hughes Electronics Corporation, El Segundo, Calif.

[21] Appl. No.: 09/135,606

[22] Filed: Aug. 18, 1998

Related U.S. Application Data

[63] Continuation-in-part of application No. 08/895,182, Jul. 16, 1997, Pat. No. 6,083,615, which is a continuation-in-part of application No. 08/577,981, Dec. 22, 1995, Pat. No. 5,665,274.

[51] Int. Cl.[7] ....................................... B32B 5/16
[52] U.S. Cl. ........................ 428/304.4; 307/323; 307/332
[58] Field of Search .................................... 428/323, 332, 428/304.4, 307.3, 317.9, 319.3, 421, 473.5, 480

[56] References Cited

U.S. PATENT DOCUMENTS

| | | |
|---|---|---|
| 4,273,697 | 6/1981 | Sumimura et al. . |
| 4,705,646 | 11/1987 | DuPont et al. . |
| 4,957,723 | 9/1990 | Nishino . |
| 5,207,949 | 5/1993 | Niino et al. .............................. 252/511 |
| 5,382,384 | 1/1995 | Baigrie et al. . |
| 5,665,212 | 9/1997 | Zhong et al. ............................ 304/297 |
| 5,665,274 | 9/1997 | Long et al. ............................. 252/511 |
| 5,837,766 | 11/1998 | Metro et al. ............................ 524/495 |
| 5,916,506 | 6/1999 | Breznak et al. ......................... 264/104 |
| 5,998,076 | 12/1999 | Mahabadi et al. ................... 430/106.6 |

FOREIGN PATENT DOCUMENTS

| | | |
|---|---|---|
| 0 241 158 | 10/1987 | European Pat. Off. . |
| 0 371 745 | 6/1990 | European Pat. Off. . |

*Primary Examiner*—H. Thi Le
*Attorney, Agent, or Firm*—T. Gudmestad; M. Sales

[57] ABSTRACT

A black film useful in thermal control has a matrix with 100 parts by weight of a polymer, and from about 1 to about 6 parts by weight of an electrically conductive carbon pigment having a porous, sponge-like structure dispersed through the matrix. The film may be a freestanding film, typically about 0.001 to about 0.003 inches thick, used as a radome. The film may instead be a liquid paint or a solid paint applied to a surface.

20 Claims, 4 Drawing Sheets

BLACK THERMAL CONTROL FILM AND THERMALLY CONTROLLED MICROWAVE DEVICE CONTAINING POROUS CARBON PIGMENTS

This application is a continuation-in-part of application Ser. No. 08/895,182, filed Jul. 16, 1997, now U.S. Pat. No. 6,083,615, which in turn is a continuation-in-part of issued application Ser. No. 08/577,981, filed Dec. 22, 1995, now U.S. Pat. No. 5,665,274.

BACKGROUND OF THE INVENTION

This invention relates to black thermal control films, and to microwave antennas having radomes utilizing such films.

Many types of microwave devices have antennas which transmit and/or receive ("transceive") microwave energy through free space. In one application, transceivers on communications satellites receive relatively faint microwave signals transmitted from earth stations, amplify those signals, and retransmit the high-power microwave signals back to earth stations at other locations. These devices and their antennas are designed to operate for years without interruption or degradation of service.

The microwave transceiver antennas used on spacecraft must be protected against several types of damage which could adversely affect their operation and operating lifetimes. They must be protected against overheating from the sun's energy when the antennas are facing the sun. They must also be protected against electrostatic charging and accumulation of dust-like debris on their surfaces.

The conventional approach to protecting antennas utilizes a radome or a protective film. The radome is a cover that fits over the antenna and through which the microwave transceived energy passes. For the spacecraft applications, the radome must have the protective functions discussed above, as well as have a low insertion loss in the microwave energy that passes through the radome material. The radome also must be light in weight, because of the high cost of lifting loads to orbit. The requirement of RF (radio frequency) transparency imposes a significant constraint on the radome, because, to some extent, the ability to prevent the buildup of electrical static charge and RF transparency are apparently incompatible. Ideally, the sunshield would be electrically conductive to bleed static charges, but be a dielectric for RF transparency.

Several approaches are known in an attempt to satisfy the shielding requirements for spacecraft antennas. In one, a polyimide film has a thin layer of a conductive material such as germanium on one side to aid in the dissipation of electrostatic charge. This material is RF transparent, but it has minimal electrostatic charge dissipation capability. Additionally, the germanium layer does not significantly contribute to the thermal properties of the freestanding film, sometimes termed a "sunshield". No sunshield film currently exists with a bulk resistivity sufficiently low to dissipate static electricity. As a result of this, bulk static discharges occur from high velocity electrons that lodge into this bulk film. All current films use surface coatings to minimize static discharge. This type of structure only dissipates surface charges and therefore bulk discharges are allowed to occur. In another approach, particles of a conductive pigment are dispersed through the film. The particles aid in dissipating the bulk charges by particle-to-particle conduction. However, conductive loadings in bulk films tend to block the transmission of RF signals. In another approach, an electrically conductive paint may be used, but such paints are heavy.

There is a need for an improved radome and film material that provides the necessary thermal control, meets microwave transmission and electrostatic discharge requirements, and also is light in weight. The present invention fulfills this need, and further provides related advantages.

SUMMARY OF THE INVENTION

The present invention provides a black film which may be provided in a freestanding form or as a paint. The freestanding film is particularly useful as a radome for microwave antennas. The film has the color-producing and charge-dissipating pigment incorporated into the film, so that no separate layer is required to accomplish these functions. Accordingly the film is quite light in weight in the desired thickness ranges. The film has a sufficiently low electrical resistivity to permit dissipation of electrostatic charge, yet has a satisfactorily low microwave insertion loss even into the $K_a$ band. There is no degradation of the film by peeling and separation mechanisms, inasmuch as the pigment is incorporated into the film rather than applied to its surface.

In accordance with the invention, a black film comprises a matrix having 100 parts by weight of a film-forming polymer, and from about 1 to about 6 parts by weight of electrically conductive carbon pigment particles having a porous, sponge-like structure dispersed through the matrix. The particles have a specific surface area of at least about 250 square meters per gram. The film is preferably used in a freestanding form as a radome covering at least a portion of the aperture of a microwave transceiving antenna such that microwave energy transceived by the antenna passes through an entire thickness of the radome. It may also be prepared as a liquid paint, and applied to a surface, where it hardens, or as a powder coating.

The freestanding film typically has a thickness of from about 0.001 inch to about 0.003 inch, although it is operable in greater or smaller thicknesses. The polymer is preferable a polyimide, but other film-forming polymers such as polytetrafluoroethylene, polyester, or polyethylene terephthalate may also be used. The carbon particles desirably have a specific surface area of at least about 500 square meters per gram, preferably from about 800 to about 1000 square meters per gram, and most preferably about 1000 square meters per gram.

The invention provides a freestanding film, which is a sheetlike element that is self supporting. It may be used as a radome to span over the aperture of an antenna. Paints are distinguished from freestanding films by being provided in a liquid form and then applied and bonded to a surface. Paints by themselves cannot be used as the radomes, which must span the width of the aperture of the antenna in a self-supporting manner. A paint may be applied to a substrate, which in turn is used as the radome, but this structure requires at least two layers and is heavier than the freestanding film of the invention. The paints according to the present invention may, however, be used in a number of protective applications. The present film requires only a single layer to accomplish the functions of physical protection, thermal control, and dissipation of electrostatic charging, while having a low insertion loss for the microwave energy.

Other features and advantages of the present invention will be apparent from the following more detailed description of the preferred embodiments, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1A:
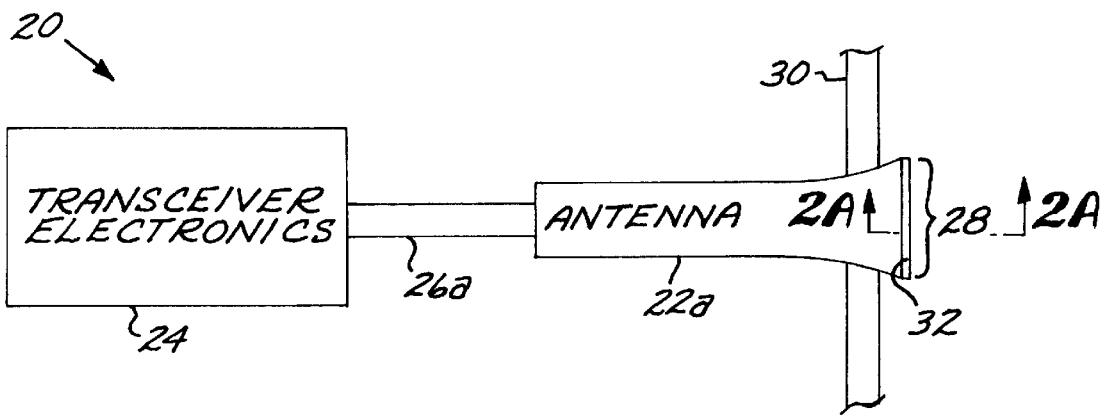
FIG. 1A is a schematic side elevational view of a first microwave device according to the invention.
Figure 1B:
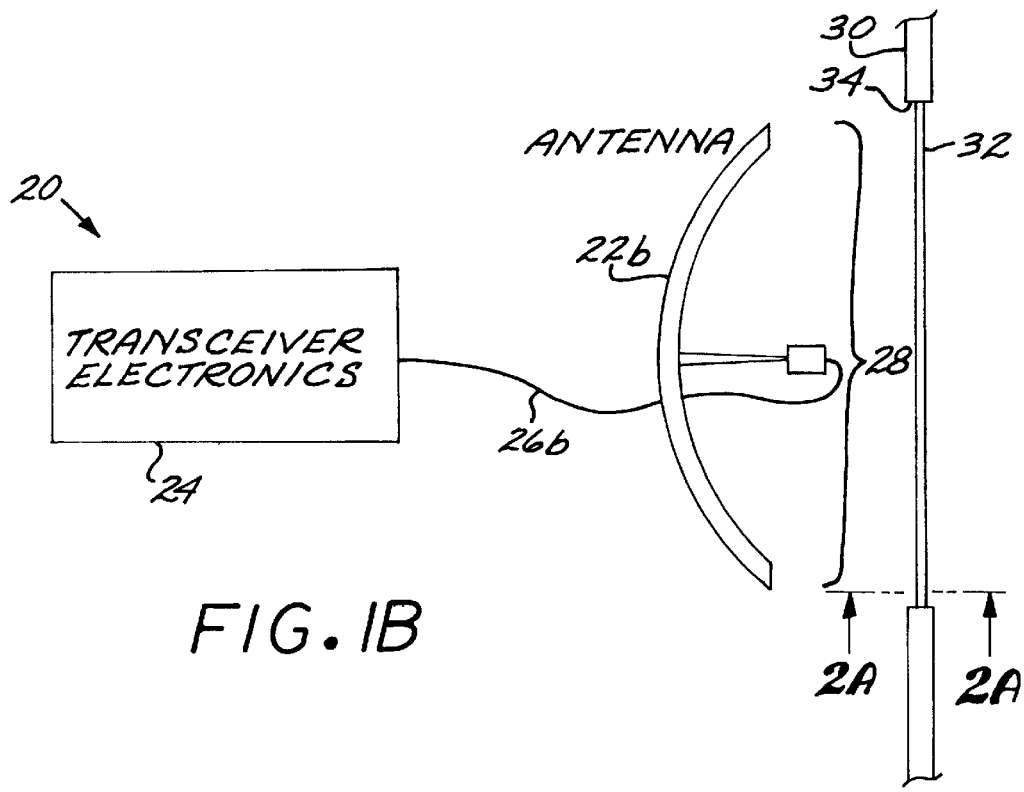
FIG. 1B is a schematic side elevational view of a second microwave device according to the invention.
Figure 1C:
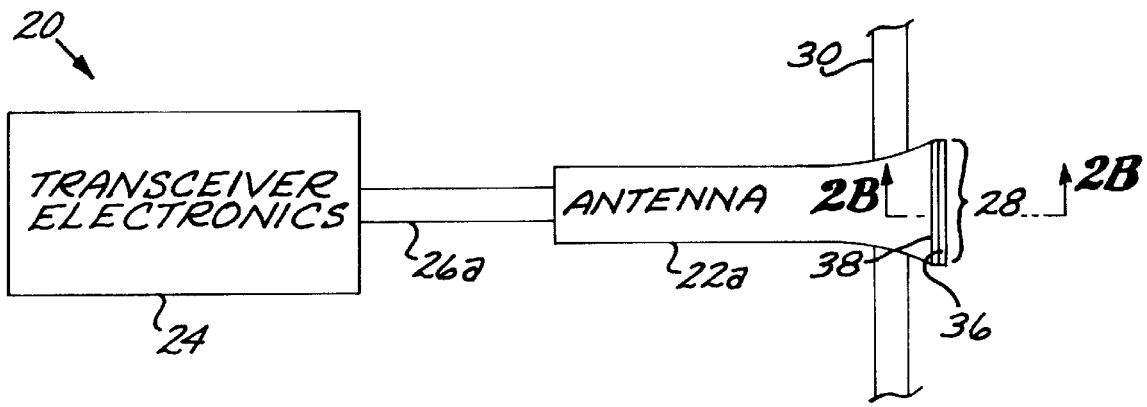
FIG. 1C is a schematic side elevational view of a third microwave device according to the invention.

FIGS. 1A–1C depict three embodiments of microwave devices 20 utilizing the approach of the present invention. Each device 20 has a microwave antenna 22 and microwave transceiver electronics 24 coupled to the antenna 22 by a microwave conductor 26. The general structure of the antenna 22, the electronics 24, and the microwave conductor 26 are known in the art. As used herein, "microwaves" are electromagnetic signals having frequencies from about 1 GHz (gigahertz) to about 100 GHz. The preferred useful range for microwave radars is from about 1 GHz to about 40 GHz. In a typical case, the device 20 operates at a frequency of about 12 GHz, and requires a low loss (less than about –0.1 db) radome to operate efficiently.

The antenna 22 may be a horn 22a, as shown in FIG. 1A and FIG. 1C, a parabolic antenna 22b, as shown in FIG. 1B, or any other type of microwave antenna. As used herein, an "antenna" is broadly defined as a component used to transmit microwaves into free space and/or to receive microwaves propagated through free space, functions incorporated within the generic term "transceive". The antenna 22 has an aperture 28 which defines the area in front of the antenna 22 through which the microwaves transceived by the antenna 22 must pass. The microwave conductor 26 may be of any operable type, and here is depicted as a waveguide 26a in FIGS. 1A and 1C, and a coaxial conductor 26b in FIG. 1B.

The antenna 22 is protected by structure around it. In some applications, the antenna is located behind a wall 30, typically made of a structural material such as a graphite fiber-reinforced composite material or thermal blankets. However, such structural materials are not sufficiently transmissive to microwave energy to be used in the area of the aperture 28.

A film according to the invention is positioned in front of the aperture 28 of the antenna 22. FIGS. 1A and 1B illustrate films provided as freestanding films, which serve as radomes. In the case of the horn-type antenna 22a of FIG. 1A, the radome 32 may cover the entire mouth of the horn. In the case of the parabolic-type antenna 22b of FIG. 1B, the radome 32 may extend across an opening 34 in the wall 30, coinciding with the area of the aperture 28. These two radome arrangements are presented by way of example. Other configurations of the radome are possible and operable with the present invention. FIG. 1C illustrates a film provided as a paint or powder film 36, which is applied to a substrate 38. The paint-covered substrate extends across the aperture 28 of the antenna 22a.

Figure 2A:
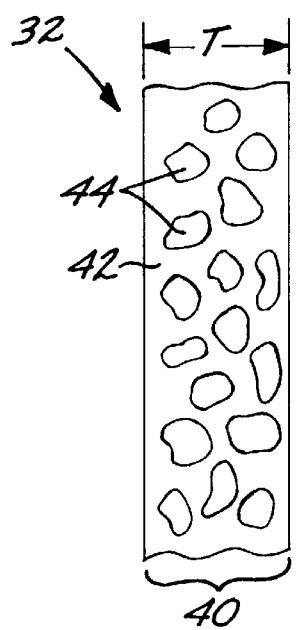
FIG. 2A is an enlarged sectional view of the radome illustrated in FIGS. 1A and 1B, taken along line 2A—2A.

FIG. 2A illustrates the structure of the radome 32 in greater detail. The radome 32 comprises a thin, black, freestanding film 40 having a matrix 42 of 100 parts by weight of a film-forming polymer, and from about 1 to about 6 parts by weight of electrically conductive carbon pigment particles 44 having a porous, sponge-like structure, dispersed through the polymeric matrix 42. The particles typically have a size range of less than about 15 micrometers in diameter. Preferably, they are from about 5 micrometers to about 15 micrometers in diameter, but are operable in smaller or larger sizes. The freestanding film 40 is preferably from about 0.001 inch to about 0.003 inch thick. The freestanding film is still functional if thinner or thicker than these limits, but it may have shortcomings for some applications. If the film is thinner than about 0.001 inch, it tends to tear easily and may not permit normal handling and installation. Such very thin films may also not be effective in blocking solar radiation. If the film is thicker than about 0.003 inch, the microwave insertion loss is too large for practical application with microwave antennas, but the film may be quite suitable for other applications.

Figure 2B:
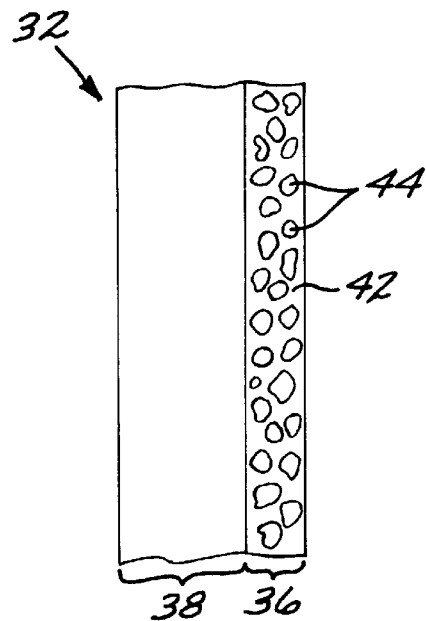
FIG. 2B is an enlarged sectional view of the paint or powder film and its substrate illustrated in FIG. 1C, taken along line 2B—2B.

FIG. 2B illustrates the paint film 36 and its substrate 38 in greater detail. The paint film 36 has the matrix 42 of 100 parts by weight of a polymer, and from about 1 to about 6 parts by weight of the electrically conductive carbon pigment particles 44 having a porous, sponge-like structure, dispersed through the polymeric matrix 42. The paint film 36 is preferably from about 0.001 inch to about 0.003 inch thick. The paint film 36 is still functional if thinner or thicker than these limits, but it may have shortcomings for some applications. If the paint film 36 is thinner than about 0.001 inch, it tends not to provide full coverage of the surface, so that multiple layers may be necessary, and it may also be too thin to block the solar radiation. If the paint film 36 is thicker than about 0.003 inch, the microwave insertion loss is too large for practical application with microwave antennas, but the paint film 36 may be quite suitable for other applications. The substrate 38 is a dielectric for the microwave signals. It typically is made of a polymer such as a polyimide.

Figure 3:
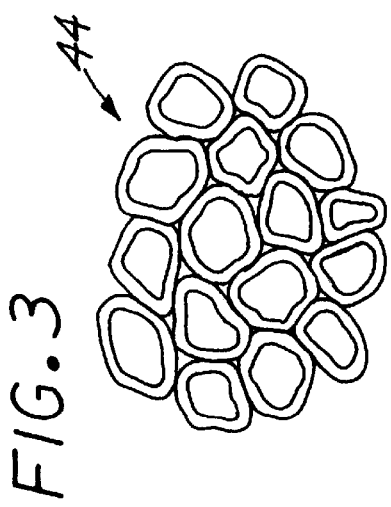
FIG. 3 is an enlarged perspective view of a carbon pigment particle used in the freestanding film of FIG. 1.

The carbon pigment particles 44 provide the black color and opaqueness of the paint film 36 and the freestanding film 40, and also are the source of its sufficient electrical conductivity to dissipate electrostatic charges. The carbon pigment particles 44 have a porous, sponge-like structure, as illustrated in FIG. 3, and a size range of from about 5 micrometers or smaller, to about 15 micrometers. Such particles are known and are available commercially. A preferred such carbon pigment particle material is Printex XE2 carbon pigment, available from Degussa Corp, Ridgefield Park, N.J. In general, such particles 44 are prepared by the combustion or thermal decomposition of hydrocarbon compounds such as those found in petroleum, liquid coal tar hydrocarbons, natural gas, and acetylene. These particles 44 have a specific surface area of at least about 250 square meters per gram, preferably from about 800 to about 1000 square meters per gram, and most preferably about 1000 square meters per gram. This morphology is to be contrasted with that of conventional graphite particles used in prior electrically conductive film applications, as illustrated for Micro 280 graphite particles in FIG. 4. Such graphite particles have a more dense, less open, substantially non-porous structure with a specific surface area that is typically on the order of about 13 square meters per gram.

Thus, for a selected weight of carbon, the sponge-like structure and small size of the particles in FIG. 3 produces more particle-to-particle, point-to-point electrically conductive contacts to accomplish the required conductivity, that extends over a larger effective volume. The result is a better, more certain interparticle charge flow path, with improved interparticle contact and connectivity, for any selected weight fraction of carbon particles that are present in the freestanding film 40 or the paint film 36. The thickness of the spong-structure walls is small in the sponge-like particles. However, because the dissipation of electrostatic charges involves only very small electrical current flows, this small wall thickness and consequent small current flow area are fully operable and acceptable, and in fact desirable due to the excellent connectivity between the particles.

The electrically conductive carbon pigment particles 44 are embedded in the dielectric polymer matrix 42 to form the electrically conductive composite film. The interparticle connectivity, contacts, and pathways between the pigment particles form electrically conductive paths through the otherwise-dielectric polymer. When the pigment particles are relatively large and non-porous, as in the prior art, a large weight fraction of the particles is necessary to achieve a specified level of electrical conductivity. On the other hand, when the particles have a porous, spongelike structure so that their surface areas and effective sizes are large for their weight, the specified level of electrical conductivity can be achieved with a much smaller weight fraction of the carbon particles than would required for conventional, substantially nonporous, particles. The latter is an important consideration, as the low fraction of carbon particles 44 allows the insertion loss of the films 36 and 40, and thence the radome 32, to be sufficiently low for use in microwave applications.

Additionally, as the film is formed during manufacturing operations or dries during paint drying, internal stresses tend to separate the pigment particles 44. The porous, spongelike carbon particles 44 used with the present approach maintain their electrically conductive paths better than do conventional graphite particles in these circumstances. The black freestanding film also has improved mechanical flexibility due to its low carbon-to-polymer ratio. The mechanical flexibility is particularly important during assembly and launch of the spacecraft.

The polymeric matrix 42 comprises an operable film-forming polymer. Not all polymers have the necessary flow properties to be formed into films, nor do all polymers have sufficient physical strength to be formed into a freestanding film. Preferably, the film-forming polymer is a polyimide such as Kapton™ polymer. Other film-forming polymers operable in the present invention include polytetrafluoroethylene (Teflon™ polymer), polyethylene terephthalate (Mylar™ polymer), and polyester. These additional film-forming polymers are presented by way of example, not limitation.

Desirably, the polymer used in the film or paint meets NASA Specification SP-R-0022A and is therefore qualified for use in a spacecraft application. This specification requires that the total mass loss (TML) not exceed 1.0 percent and the proportion of collected volatile condensable material (CVCM) be not more than 0.10 percent, when tested by the method set forth in ASTM E595. This testing process is discussed in W. Campbell, Jr. and R. Marriott, *Outgassing Data for Selected Spacecraft Materials*, NASA Reference Publication 1124 Revised (1987), pages 1–3.

Figure 4:
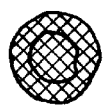
FIG. 4 is an enlarged perspective view of a conventional dense graphite particle.

For each 100 parts by weight of the polymer of the matrix 42, the porous, spongelike carbon pigment particles 44 of the type illustrated in FIG. 3 are present in an amount of from about 1 to about 6 parts by weight. If too little carbon pigment is present, the electrical conductivity of the final freestanding film is insufficient to dissipate electrostatic charges (i.e., the film has a resistivity of more than about $10^9$ ohms per square). If too much carbon pigment is present, the equivalent RF electrical resistivity of the final film is too low (i.e., less than about $10^4$ ohms per square), so that the film will tend to exhibit too high a microwave insertion loss. Additionally, if too much carbon pigment is present the mechanical properties of the film are unacceptably low, and the flexibility of the film is reduced below acceptable levels. Most preferably, from about 3 to about 4 parts by weight of the pigment is present for each 100 parts of the polymer-mix formulation. (By contrast, about 15–18 or more parts by weight of the conventional graphite particles of the type illustrated in FIG. 4 is required to achieve acceptable electrical conductivity in electrostatic-dissipative conductive black films, with the result that the freestanding film exhibits too great a microwave insertion loss to be operable in the preferred applications.)

Figure 5:
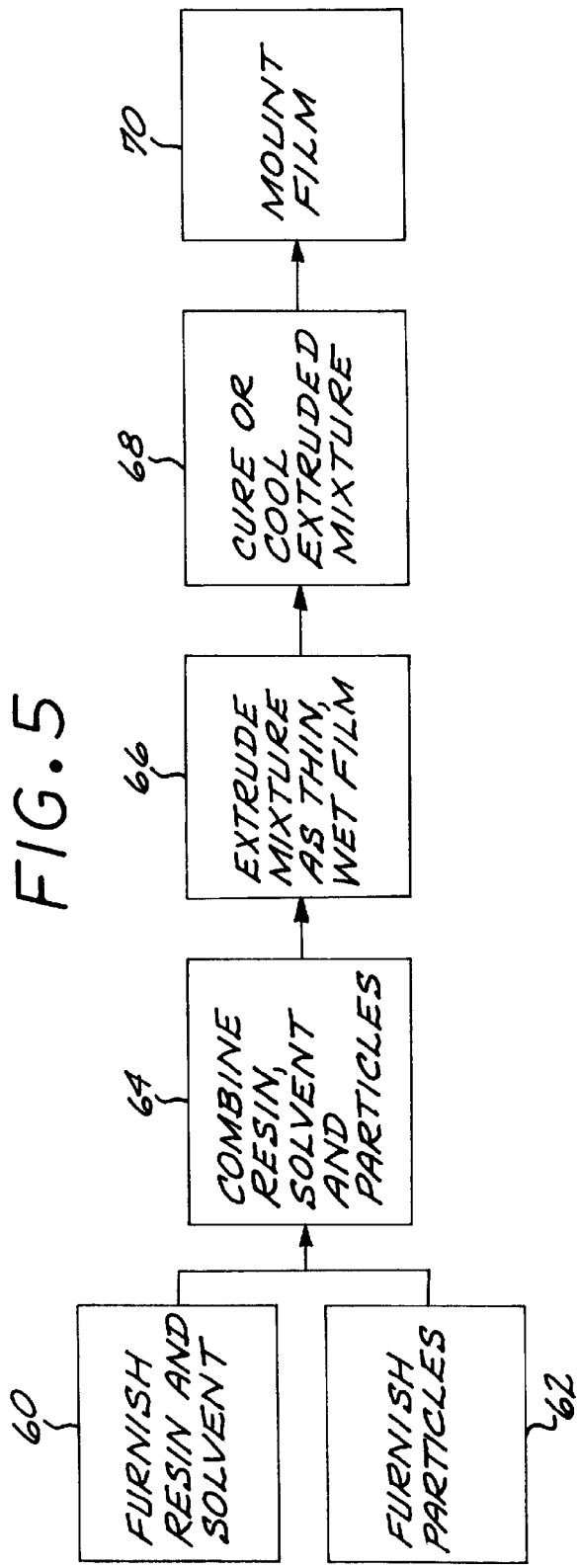
FIG. 5 is a block diagram of a method for the preparation of the freestanding film according to the invention and the protection of a microwave device.

FIG. 5 depicts a method for preparing the freestanding film 40 according to the invention. The resin formulation that is processed into the matrix 42 is furnished, numeral 60, together with an appropriate solvent for the resin, if necessary. This resin is the precursor of the polymer that forms the matrix 42. The particles 44 are furnished, numeral 62. The particles 44 are mixed into the resin formulation, numeral 64, together with additional solvent for the resin as necessary. The composite mixture of particles in flowable resin material is extruded or otherwise processed into the film of the desired thickness, numeral 66. Continuous film extruders and other types of film-forming apparatus and procedures are known in the art. After the film is formed, it is processed into its solid form, numeral 68. If the resin is thermosetting and the extrusion step 66 was conducted at relatively low temperature, the extruded film is heated to elevated temperature to cure the resin. If the resin is thermoplastic and the extrusion was conducted at relatively high temperature, the extruded film is cooled to a lower temperature so that it hardens. Finally, the solid film 40 is mounted, as between flanges holding the edges of the film, as the radome 32.

Figure 6:
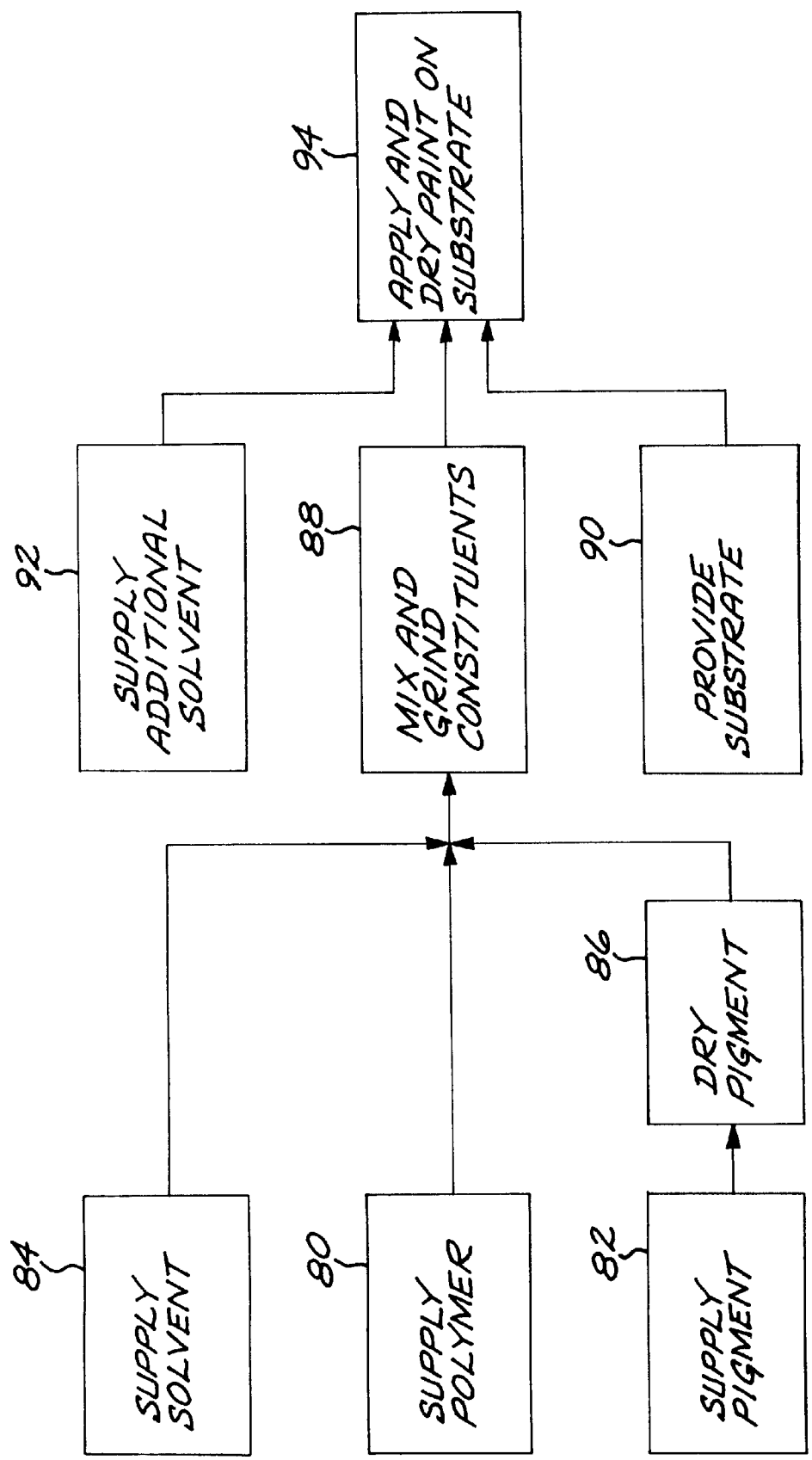
FIG. 6 is a block diagram of a method for the preparation of the paint or powder film according to the invention and the protection of a microwave device.

FIG. 6 illustrates a procedure for preparation and application of the black paint film 36. The polymer-mix formulation is provided, numeral 80, the carbon pigment particles are provided, numeral 82, and the solvent required for paint mixing is provided, numeral 84. The preferred polymer and particles are as described earlier. The preferred solvent is naphtha, xylene, or a mixture thereof. The pigment is dried in an oven for 2 hours in air at 250° F., numeral 86. These constituents are mixed and ground together, numeral 88. To accomplish this step 88, the three constituents are placed into a closed ceramic jar with a ceramic grinding media. The ceramic jar is placed onto a mechanical roller mill and ground until the pigment reaches a Hegman grind of at least 7, which typically requires about 4–6 hours of grinding.

The substrate is provided, numeral 90. Optionally, additional solvent is provided, numeral 92. No additional solvent is required for application by a blading, rolling, or brushing approach. About 10–20 parts by weight of additional solvent is typically required for spray application. The paint is applied by the selected technique and allowed to dry at ambient temperature, numeral 94. The thickness of the paint layer 20 is typically about 0.001–0.002 inches after drying. It is preferred to apply additional layers of about this thickness in order to build up a thicker layer if such a thicker layer is desired, with intermediate drying of each layer before the next layer is applied.

The final film, whether in freestanding form or in paint/powder form, desirably has a radio frequency insertion loss of from about −0.01 db to about −0.2 db within at least some portion of the frequency range of from about 1 GHz to about 40 GHz. The final film, whether in freestanding form or in paint/powder form, desirably has a DC surface resistivity of from about $10^4$ ohms per square to about $10^9$ ohms per square within at least some portion of the frequency range of from about 1 GHz to about 40 GHz.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A thermally controlled microwave device, comprising:
    a microwave device having a microwave transceiver antenna with an aperture;
    a film overlying at least a portion of the aperture of the antenna, the film comprising
        a matrix having 100 parts by weight of a polymer, and
        from about 1 to about 6 parts by weight of electrically conductive carbon pigment particles having a porous, sponge-like structure, dispersed through the matrix, wherein the particles have a specific surface area of at least about 250 square meters per gram.

2. The device of claim 1, wherein the film comprises a freestanding film.

3. The device of claim 2, wherein the freestanding film has a thickness of from about 0.001 inch to about 0.003 inch.

4. The device of claim 1, wherein the film comprises a paint.

5. The device of claim 1, wherein the polymer is selected from the group consisting of polyimide, polytetrafluoroethylene, polyethylene terephthalate, and polyester.

6. The device of claim 1, wherein the particles have a specific surface area of at least about 500 square meters per gram.

7. The device of claim 1, wherein the particles have a specific surface area of from about 800 to about 1000 square meters per gram.

8. The device of claim 1, wherein the particles have a specific surface area of about 1000 square meters per gram.

9. The device of claim 1, wherein the transceiver antenna transceives microwave power of a frequency of from about 1 GHz to about 40 GHz.

10. A black film, comprising:
    a matrix having 100 parts by weight of a film-forming polymer, and
    from about 1 to about 6 parts by weight of electrically conductive carbon pigment particles having a porous, sponge-like structure, dispersed through the matrix, wherein the particles have a specific surface area of at least about 250 square meters per gram.

11. The film of claim 10, wherein the film comprises a freestanding film.

12. The film of claim 11, wherein the freestanding film has a thickness of from about 0.001 inch to about 0.003 inch.

13. The film of claim 10, wherein the film comprises a paint.

14. The film of claim 10, wherein the polymer is selected from the group consisting of polyimide, polytetrafluoroethylene, polyethylene terephthalate, and polyester.

15. The film of claim 10, wherein the particles have a specific surface area of at least about 500 square meters per gram.

16. The film of claim 10, wherein the particles have a specific surface area of from about 800 to about 1000 square meters per gram.

17. The film of claim 10, wherein the particles have a specific surface area of about 1000 square meters per gram.

18. The film of claim 10, wherein the radio frequency insertion loss of the film is from about −0.01 db to about −0.2 db within at least some portion of the frequency range of from about 1 GHz to about 40 GHz.

19. The film of claim 10, wherein the DC surface resistivity of the film is from about $10^4$ ohms per square to about $10^9$ ohms per square within at least some portion of the frequency range of from about 1 GHz to about 40 GHz.

20. The film of claim 10, wherein the carbon pigment particles have a size of from about 5 micrometers to about 15 micrometers.

* * * * *